US012651826B2

(12) United States Patent
Rush et al.

(10) Patent No.: US 12,651,826 B2
(45) Date of Patent: Jun. 9, 2026

(54) ELECTRONIC DEVICE WITH FOLDED ANTENNA MODULE

(71) Applicant: Apple Inc., Cupertino, CA (US)

(72) Inventors: Alden T Rush, San Diego, CA (US); Salih Yarga, San Jose, CA (US); Joel Ravi, San Francisco, CA (US); Woonyong Bae, San Jose, CA (US); Laura M Burke, Los Gatos, CA (US); Bhaskara R Rupakula, San Jose, CA (US); Haozhan Tian, San Jose, CA (US); Erdinc Irci, Sunnyvale, CA (US); Hongfei Hu, Cupertino, CA (US); Carlo Di Nallo, Belmont, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 18/464,969

(22) Filed: Sep. 11, 2023

(65) Prior Publication Data

US 2025/0087868 A1 Mar. 13, 2025

(51) Int. Cl.
*H01Q 1/24* (2006.01)
*H01Q 3/36* (2006.01)
*H01Q 5/25* (2015.01)

(52) U.S. Cl.
CPC ............... *H01Q 1/243* (2013.01); *H01Q 3/36* (2013.01); *H01Q 5/25* (2015.01)

(58) Field of Classification Search
USPC .......................................................... 343/702
See application file for complete search history.

(56) References Cited

U.S. PATENT DOCUMENTS

| | | | | |
|---|---|---|---|---|
| 9,627,754 | B2 * | 4/2017 | Na | H01Q 9/42 |
| 10,418,687 | B2 | 9/2019 | Mow et al. | |
| 10,530,052 | B2 * | 1/2020 | Sudo | H01Q 5/50 |
| 10,931,013 | B2 | 2/2021 | Cooper et al. | |

(Continued)

FOREIGN PATENT DOCUMENTS

| | | | |
|---|---|---|---|
| KR | 20130079019 | A | 7/2013 |
| KR | 20230023538 | A | 2/2023 |
| WO | 2022235071 | A1 | 11/2022 |

OTHER PUBLICATIONS

U.S. Appl. No. 17/730,039, filed Apr. 26, 2022.

*Primary Examiner* — Dimary S Lopez Cruz
*Assistant Examiner* — Brandon Sean Woods
(74) *Attorney, Agent, or Firm* — Treyz Law Group, P.C.; Michael H. Lyons

(57) ABSTRACT

An electronic device may be provided with a housing having sidewalls, a dielectric cover, and a conductive plate. A display may be mounted to the sidewalls opposite the dielectric cover. A logic board may be interposed between the display and the plate. The device may include a phased antenna array on a first module and an ultra-wideband (UWB) on a second module. The first and second modules may be surface-mounted to the main body of a flexible printed circuit between the plate and the dielectric cover. The UWB antenna and the array may convey radio-frequency signals through the dielectric cover. The flexible printed circuit may have a tail that carries the transmission lines for the UWB antenna and the array. The tail may be folded through a hole in the mid-chassis and coupled to a radio-frequency connector on the logic board.

20 Claims, 11 Drawing Sheets

(56) References Cited

U.S. PATENT DOCUMENTS

| | | | | |
|---|---|---|---|---|
| 10,957,978 | B2 | 3/2021 | Cooper et al. | |
| 11,239,550 | B2 | 2/2022 | Cooper et al. | |
| 11,283,156 | B2 * | 3/2022 | Jeon | H01Q 1/38 |
| 11,626,898 | B2 | 4/2023 | Horiuchi et al. | |
| 2016/0381784 | A1 * | 12/2016 | Miura | H05K 1/028<br>343/860 |
| 2019/0027808 | A1 | 1/2019 | Mow et al. | |
| 2020/0035204 | A1 * | 1/2020 | Wu | G09G 5/14 |
| 2021/0305679 | A1 * | 9/2021 | Ramm | H01Q 1/085 |
| 2022/0085488 | A1 | 3/2022 | Irci et al. | |
| 2022/0094053 | A1 | 3/2022 | Jiang et al. | |
| 2022/0102864 | A1 * | 3/2022 | Morimoto | H01Q 1/3291 |
| 2022/0352635 | A1 | 11/2022 | Compton | |
| 2023/0246327 | A1 * | 8/2023 | Han | H04M 1/0277<br>343/702 |

* cited by examiner

ELECTRONIC DEVICE WITH FOLDED ANTENNA MODULE

FIELD

This relates generally to electronic devices, including electronic devices with wireless communications capabilities.

BACKGROUND

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies.

SUMMARY

An electronic device may be provided with a housing having peripheral conductive housing structures, a dielectric cover layer, and a mid-chassis. A display may be mounted to the peripheral conductive housing structures opposite the dielectric cover layer. A logic board may be interposed between the display and the mid-chassis. The logic board may be layered onto the mid-chassis.

The electronic device may include wireless circuitry. The wireless circuitry may include a phased antenna array and an ultra-wideband (UWB) antenna. The phased antenna array may be formed on a first dielectric substrate. The UWB antenna may be formed on a second dielectric substrate. The first and second dielectric substrates may be surface-mounted to the main body of a flexible printed circuit. The main body of the flexible printed circuit may be layered onto the mid-chassis between the mid-chassis and the dielectric cover layer. The UWB antenna and the phased antenna array may convey radio-frequency signals through the dielectric cover layer. The dielectric substrates are not adhered to the dielectric cover layer, allowing the dielectric cover layer to be easily removed.

The flexible printed circuit may have a tail that carries the transmission lines for the UWB antenna and the phased antenna array. The tail may be folded through a hole in the mid-chassis and coupled to a radio-frequency connector on the logic board. In this way, the UWB antenna and the phased antenna array may provide wireless coverage through the rear of the device with a minimal radio-frequency path length between the logic board and the antennas.

DETAILED DESCRIPTION

Figure 1:
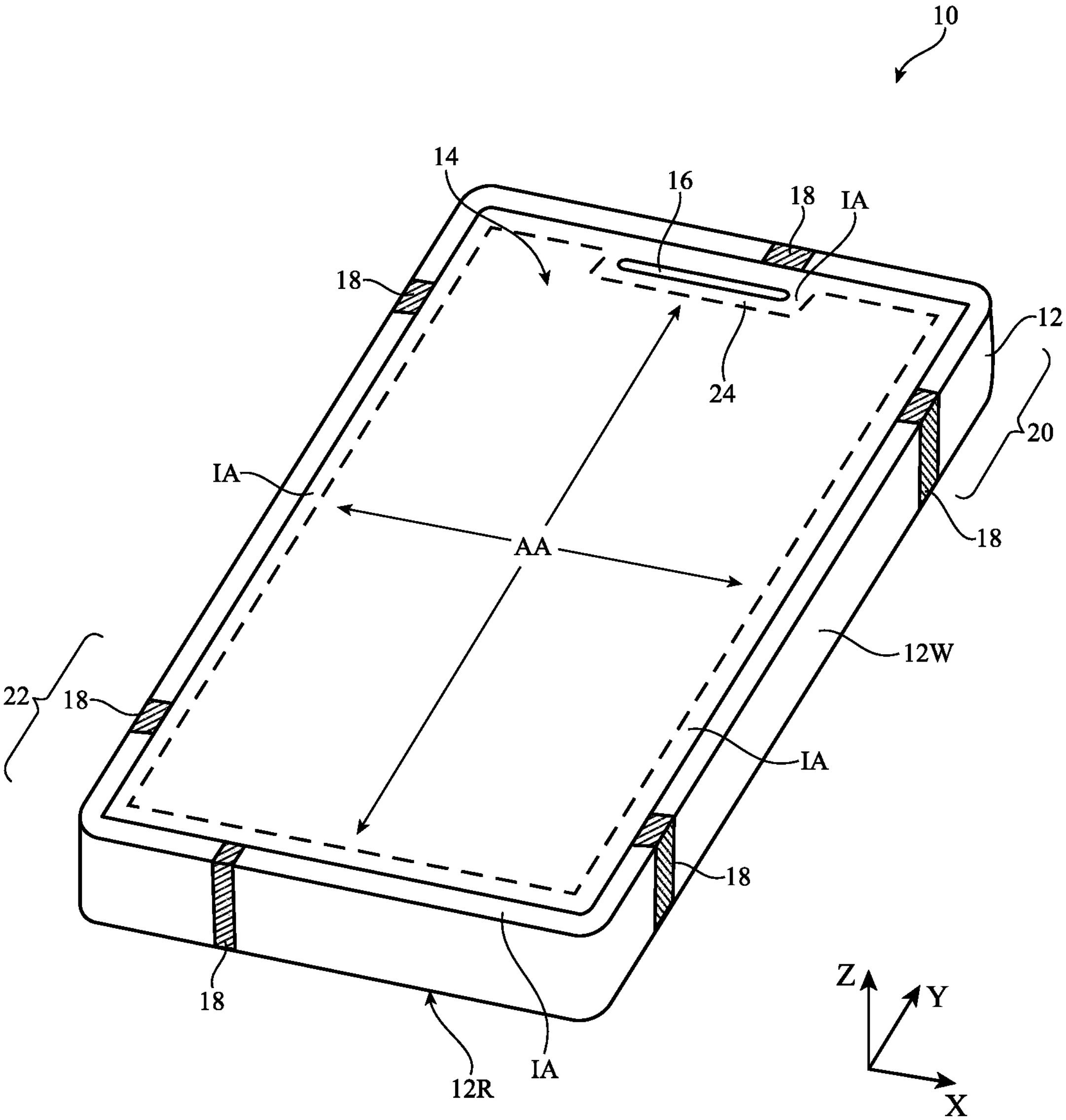
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals in different frequency bands and/or using different radio access technologies.

Device 10 may be a portable electronic device or other suitable electronic device. For example, device 10 may be a laptop computer, a tablet computer, a somewhat smaller device such as a wrist-watch device, pendant device, headphone device, earpiece device, headset device (e.g., virtual, augmented, or mixed reality glasses or goggles), or another wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (e.g., peripheral conductive housing structures 12W may cover only the edge of housing 12 that surrounds display 14 and not the rest of the sidewalls of housing 12).

Rear housing wall 12R may lie in a plane that is parallel to display 14. Rear housing wall 12R of device 10 may include one or more dielectric layers (e.g., dielectric cover layers) such as a glass, ceramic, sapphire and/or plastic layer. If desired, some or all of rear housing wall 12R may be formed from metal (e.g., metal overlapping the one or more dielectric layers). Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. One or more sensors may be aligned with notch 24 and may transmit and/or receive light through display 14 within notch 24. Alternatively, notch 24 may be defined on all sides by (e.g., may be surrounded and enclosed by) active area AA (e.g., notch 24 may form an inactive island in the pixel circuitry of display 14).

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or mid-chassis) that spans the walls of housing 12 between rear housing wall 12R and display 10. The mid-chassis may be welded to opposing walls of peripheral conductive housing structures 12W or, if desired, the mid-chassis and peripheral conductive housing walls 12W may be formed from a single integral piece of machined metal. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, the mid-chassis, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is illustrative and non-limiting.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is illustrative and non-limiting. If desired, housing 12 may have other shapes (e.g., a square shape, cylindrical shape, spherical shape, combinations of these and/or different shapes, etc.).

Figure 2:
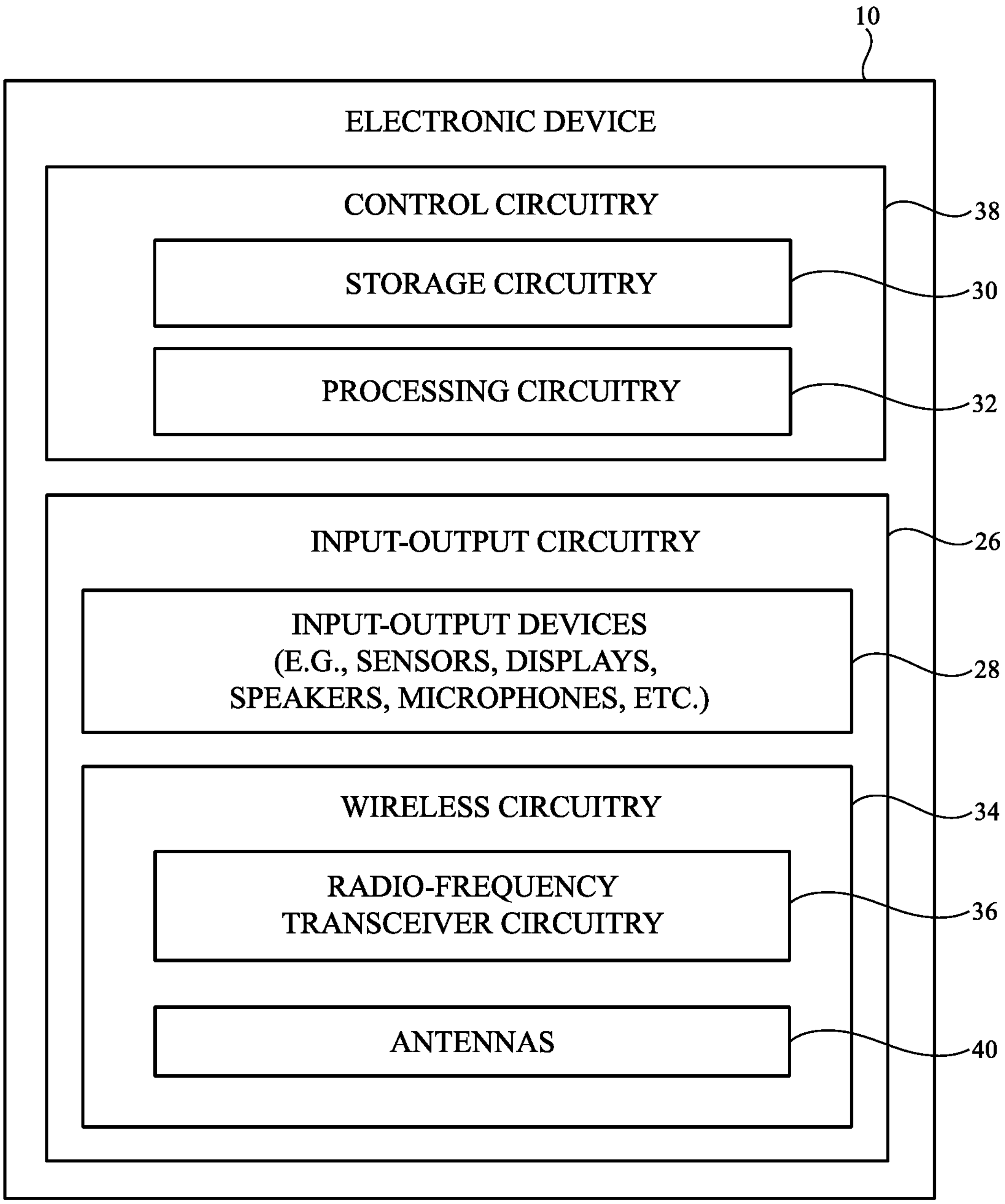
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols-sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time-of-flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

In some implementations that are described herein as an example, antennas 40 include a first set of antennas for conveying radio-frequency signals in UWB frequency band (s) (sometimes referred to herein as UWB antennas 40U) and a second set of antennas that form one or more phased antenna arrays (sometimes referred to herein as millimeter/centimeter wave antennas 40M). The first set of antennas may include a triplet or doublet of antennas for conveying radio-frequency signals in UWB frequency bands (sometimes referred to herein as UWB antennas). The phased antenna arrays may convey radio-frequency signals using millimeter and/or centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, the phased antenna array may include a first set of two or more antennas that convey radio-frequency signals in a first 5G NR FR2 frequency band (e.g., around 24-30 GHz) and a second set of two or more antennas that convey radio-frequency signals in a 5G NR FR2 frequency band (e.g., around 37-43 GHz).

Figure 3:
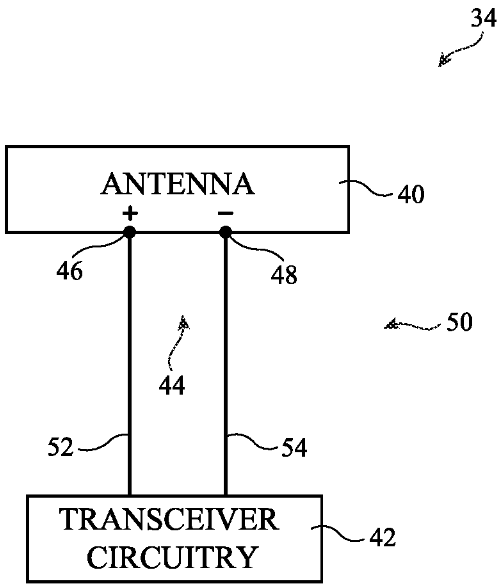
FIG. 3 is a schematic diagram of illustrative wireless circuitry in accordance with some embodiments.

A schematic diagram of wireless circuitry 34 is shown in FIG. 3. As shown in FIG. 3, wireless circuitry 34 may include transceiver circuitry 36 that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as positive signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc. In one suitable arrangement that is sometimes described herein as an example, radio-frequency transmission line path 50 may include a stripline transmission line coupled to transceiver circuitry 36 and a microstrip transmission line coupled between the stripline transmission line and antenna 40.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, or other antenna having an antenna feed 44 with a positive antenna feed terminal such as positive antenna feed terminal 46 and a ground antenna feed terminal such as ground antenna feed terminal 48. Positive antenna feed terminal 46 may be coupled to an antenna resonating element for antenna 40. Ground antenna feed terminal 48 may be coupled to an antenna ground for antenna 40.

Signal conductor 52 may be coupled to positive antenna feed terminal 46 and ground conductor 54 may be coupled to ground antenna feed terminal 48. Other types of antenna feed arrangements may be used if desired. For example, antenna 40 may be fed using multiple feeds each coupled to a respective port of transceiver circuitry 36 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 36 and the positive antenna feed terminals if desired (e.g., to selectively activate one or more positive antenna feed terminals at any given time). The illustrative feeding configuration of FIG. 3 is merely illustrative.

During operation, device 10 may communicate with external wireless equipment. If desired, device 10 may use radio-frequency signals conveyed between device 10 and the external wireless equipment to identify a location of the external wireless equipment relative to device 10. Device 10 may identify the relative location of the external wireless equipment by identifying a range to the external wireless equipment (e.g., the distance between the external wireless equipment and device 10) and the angle of arrival (AoA) of radio-frequency signals from the external wireless equipment (e.g., the angle at which radio-frequency signals are received by device 10 from the external wireless equipment).

Figure 4:
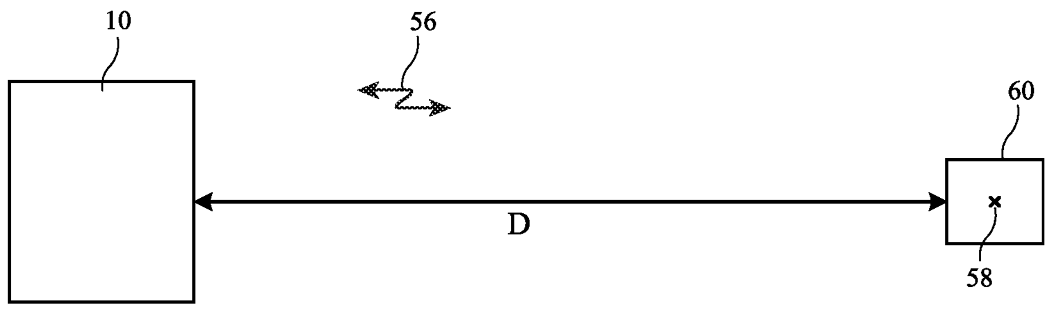
FIG. 4 is a diagram of an illustrative electronic device in wireless communication with an external node in a network in accordance with some embodiments.

FIG. 4 is a diagram showing how device 10 may determine a distance D between device 10 and external wireless equipment such as wireless network node 60 (sometimes referred to herein as wireless equipment 60, wireless device 60, external device 60, or external equipment 60). Node 60 may include devices that are capable of receiving and/or transmitting radio-frequency signals such as radio-frequency signals 56. Node 60 may include tagged devices (e.g., any suitable object that has been provided with a wireless receiver and/or a wireless transmitter), electronic equipment (e.g., an infrastructure-related device), and/or other electronic devices (e.g., devices of the type described in connection with FIG. 1, including some or all of the same wireless communications capabilities as device 10).

For example, node 60 may be a laptop computer, a tablet computer, a somewhat smaller device such as a wrist-watch device, pendant device, headphone device, earpiece device, headset device (e.g., virtual or augmented reality headset devices), or other wearable or miniature device, a handheld device such as a cellular telephone, a media player, or other small portable device. Node 60 may also be a set-top box, a camera device with wireless communications capabilities, a desktop computer, a display into which a computer or other processing circuitry has been integrated, a display without an integrated computer, or other suitable electronic equipment. Node 60 may also be a key fob, a wallet, a book, a pen, or other object that has been provided with a low-power transmitter (e.g., an RFID transmitter or other transmitter). Node 60 may be electronic equipment such as a thermostat, a smoke detector, a Bluetooth® Low Energy (Bluetooth LE) beacon, a Wi-Fi® wireless access point, a wireless base station, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device. Device 10 may also be one of these types of devices if desired.

As shown in FIG. 4, device 10 may communicate with node 60 using wireless radio-frequency signals 56. Radio-frequency signals 56 may include Bluetooth® signals, near-field communications signals, wireless local area network signals such as IEEE 802.11 signals, millimeter wave communication signals such as signals at 60 GHz, UWB signals, other radio-frequency wireless signals, infrared signals, etc. In one suitable arrangement that is described herein by example, radio-frequency signals 56 are UWB signals conveyed in multiple UWB communications bands such as the 6.5 GHz and 8 GHz UWB communications bands. Radio-frequency signals 56 may be used to determine and/or convey information such as location and orientation information. For example, control circuitry 38 in device 10 (FIG. 2) may determine the location 58 of node 60 relative to device 10 using radio-frequency signals 56.

In arrangements where node 60 is capable of sending or receiving communications signals, control circuitry 38 (FIG. 2) on device 10 may determine distance D using radio-frequency signals 56 of FIG. 4. The control circuitry may determine distance D using signal strength measurement schemes (e.g., measuring the signal strength of radio-frequency signals 56 from node 60) or using time-based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, the control circuitry may use information from Global Positioning System receiver circuitry, proximity sensors (e.g., infrared proximity sensors or other proximity sensors), image data from a camera, motion sensor data from motion sensors, and/or using other circuitry on device 10 to help determine distance D. In addition to determining the distance D between device 10 and node 60, the control circuitry may determine the orientation of device 10 relative to node 60.

Figure 5:
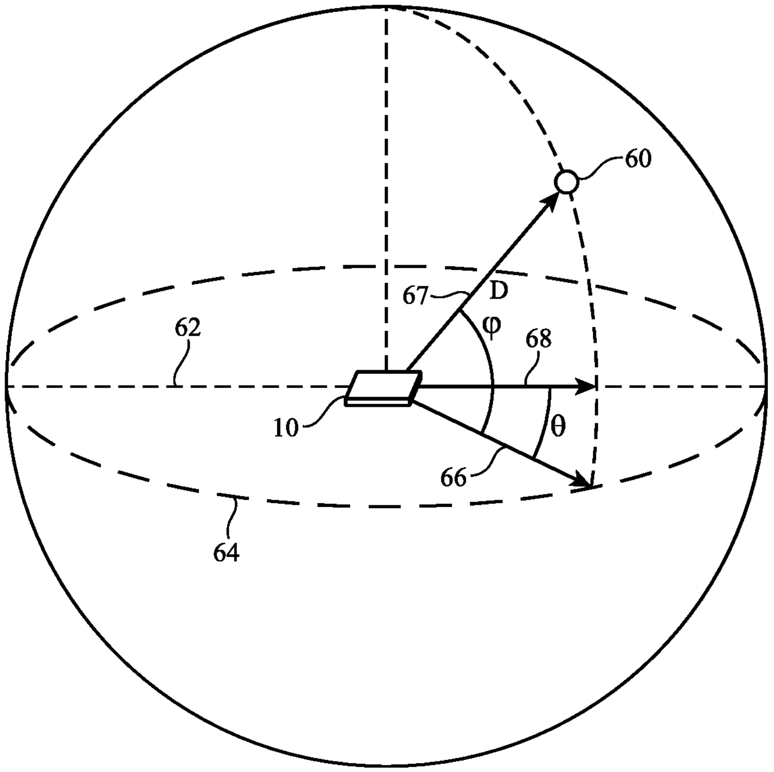
FIG. 5 is a diagram showing how the location (e.g., range and angle of arrival) of an external node in a network may be determined relative to an electronic device in accordance with some embodiments.

FIG. 5 illustrates how the position and orientation of device 10 relative to nearby nodes such as node 60 may be determined. In the example of FIG. 5, the control circuitry on device 10 (e.g., control circuitry 38 of FIG. 2) uses a horizontal polar coordinate system to determine the location and orientation of device 10 relative to node 60. In this type of coordinate system, the control circuitry may determine an azimuth angle θ and/or an elevation angle ϕ to describe the position of nearby nodes 60 relative to device 10. The control circuitry may define a reference plane such as local horizon 64 and a reference vector such as reference vector 68. Local horizon 64 may be a plane that intersects device 10 and that is defined relative to a surface of device 10 (e.g., the front or rear face of device 10). For example, local horizon 64 may be a plane that is parallel to or coplanar with display 14 of device 10 (FIG. 1). Reference vector 68 (sometimes referred to as the "north" direction) may be a vector in local horizon 64. If desired, reference vector 68 may be aligned with longitudinal axis 62 of device 10 (e.g., an axis running lengthwise down the center of device 10 and parallel to the longest rectangular dimension of device 10, parallel to the Y-axis of FIG. 1). When reference vector 68 is aligned with longitudinal axis 62 of device 10, reference vector 68 may correspond to the direction in which device 10 is being pointed.

Azimuth angle θ and elevation angle ϕ may be measured relative to local horizon 64 and reference vector 68. As shown in FIG. 5, the elevation angle ϕ (sometimes referred to as altitude) of node 60 is the angle between node 60 and local horizon 64 of device 10 (e.g., the angle between vector 67 extending between device 10 and node 60 and a coplanar vector 66 extending between device 10 and local horizon 64). The azimuth angle θ of node 60 is the angle of node 60 around local horizon 64 (e.g., the angle between reference vector 68 and vector 66). In the example of FIG. 5, the azimuth angle θ and elevation angle ϕ of node 60 are greater than 0°.

If desired, other axes besides longitudinal axis 62 may be used to define reference vector 68. For example, the control circuitry may use a horizontal axis that is perpendicular to longitudinal axis 62 as reference vector 68. This may be useful in determining when nodes 60 are located next to a side portion of device 10 (e.g., when device 10 is oriented side-to-side with one of nodes 60).

After determining the orientation of device 10 relative to node 60, the control circuitry on device 10 may take suitable action. For example, the control circuitry may send information to node 60, may request and/or receive information from 60, may use display 14 (FIG. 1) to display a visual indication of wireless pairing with node 60, may use speakers to generate an audio indication of wireless pairing with node 60, may use a vibrator, a haptic actuator, or other mechanical element to generate haptic output indicating wireless pairing with node 60, may use display 14 to display a visual indication of the location of node 60 relative to device 10, may use speakers to generate an audio indication of the location of node 60, may use a vibrator, a haptic actuator, or other mechanical element to generate haptic output indicating the location of node 60, and/or may take other suitable action.

In one suitable arrangement, device 10 may determine the distance between the device 10 and node 60 and the orientation of device 10 relative to node 60 using two or more ultra-wideband antennas. The ultra-wide band antennas may receive radio-frequency signals from node 60 (e.g., radio-frequency signals 56 of FIG. 4). Time stamps in the wireless communication signals may be analyzed to determine the time of flight of the wireless communication signals and thereby determine the distance (range) between device 10 and node 60. Additionally, angle of arrival (AoA) measurement techniques may be used to determine the orientation of electronic device 10 relative to node 60 (e.g., azimuth angle θ and elevation angle ϕ).

In angle of arrival measurement, node 60 transmits a radio-frequency signal to device 10 (e.g., radio-frequency signals 56 of FIG. 4). Device 10 may measure a delay in arrival time of the radio-frequency signals between the two or more ultra-wideband antennas. The delay in arrival time (e.g., the difference in received phase at each ultra-wideband antenna) can be used to determine the angle of arrival of the radio-frequency signal (and therefore the angle of node 60 relative to device 10). Once distance D and the angle of arrival have been determined, device 10 may have knowledge of the precise location of node 60 relative to device 10.

Figure 6:
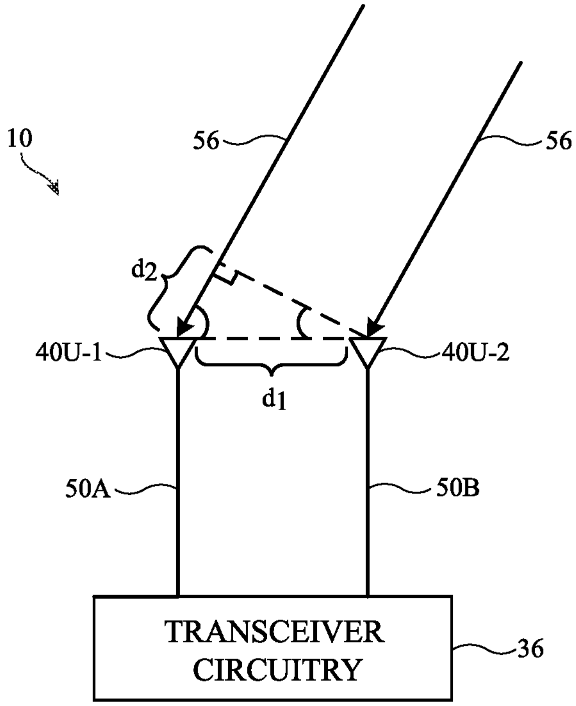
FIG. 6 is a diagram showing how illustrative ultra-wideband antennas in an electronic device may be used for detecting angle of arrival in accordance with some embodiments.

FIG. 6 is a schematic diagram showing how angle of arrival measurement techniques may be used to determine the orientation of device 10 relative to node 60. Device 10 may include multiple antennas 40 for conveying radio-frequency signals in one or more UWB frequency bands (sometimes referred to herein as UWB antennas 40U). As shown in FIG. 6, the UWB antennas 40U in device 10 may include at least a first UWB antenna 40U-1 and a second UWB antenna 40U-2. UWB antennas 40U-1 and 40U-2 may be coupled to transceiver circuitry 36 over respective radio-frequency transmission line paths 50 (e.g., a first radio-frequency transmission line path 50A and a second radio-frequency transmission line path 50B).

Transceiver circuitry 36 and UWB antennas 40U-1 and 40U-2 may operate at UWB frequencies (e.g., transceiver circuitry 36 may convey UWB signals using UWB antennas 40U-1 and 40U-2).

UWB antennas 40U-1 and 40U-2 may each receive radio-frequency signals 56 from node 60 (FIG. 5). UWB antennas 40U-1 and 40U-2 may be laterally separated by a distance $d_1$, where UWB antenna 40U-1 is farther away from node 60 than UWB antenna 40U-2 (in the example of FIG. 6). Therefore, radio-frequency signals 56 travel a greater distance to reach UWB antenna 40U-1 than UWB antenna 40U-2. The additional distance between node 60 and UWB antenna 40U-1 is shown in FIG. 6 as distance $d_2$. FIG. 6 also shows angles a and b (where a+b=90°).

Distance $d_2$ may be determined as a function of angle a or angle b (e.g., $d_2=d_1*\sin(a)$ or $d_2=d_1*\cos(b)$). Distance $d_2$ may also be determined as a function of the phase difference between the signal received by UWB antenna 40U-1 and the signal received by ultra-wideband antenna 40U-2 (e.g., $d_2=(PD)*\lambda/(2*\pi)$), where PD is the phase difference (sometimes written "$\Delta\phi$") between the signal received by UWB antenna 40U-1 and the signal received by UWB antenna 40U-2, and $\lambda$ is the wavelength of radio-frequency signals 56. Device 10 may include phase measurement circuitry coupled to each antenna to measure the phase of the received signals and to identify phase difference PD (e.g., by subtracting the phase measured for one antenna from the phase measured for the other antenna). The two equations for $d_2$ may be set equal to each other (e.g., $d_1*\sin(a)=(PD)*\lambda/(2*\pi)$) and rearranged to solve for the angle a (e.g., $a=\sin^{-1}((PD)*\lambda/(2*\pi*d_1))$) or the angle b. Therefore, the angle of arrival may be determined (e.g., by control circuitry 38 of FIG. 2) based on the known (predetermined) distance $d_1$ between UWB antennas 40U-1 and 40U-2, the detected (measured) phase difference PD between the signal received by UWB antenna 40U-1 and the signal received by UWB antenna 40U-2, and the known wavelength (frequency) of the received radio-frequency signals 56. Angles a and/or b of FIG. 6 may be converted to spherical coordinates to obtain azimuth angle $\theta$ and elevation angle $\phi$ of FIG. 5, for example. Control circuitry 38 (FIG. 2) may determine the angle of arrival of radio-frequency signals 56 by calculating one or both of azimuth angle $\theta$ and elevation angle $\phi$.

Distance $d_1$ may be selected to ease the calculation for phase difference PD between the signal received by UWB antenna 40U-1 and the signal received by UWB antenna 40U-2. For example, $d_1$ may be less than or equal to one half of the wavelength (e.g., effective wavelength) of the received radio-frequency signals 56 (e.g., to avoid multiple phase difference solutions).

With two antennas for determining angle of arrival (as in FIG. 6), the angle of arrival within a single plane may be determined. For example, UWB antennas 40U-1 and 40U-2 in FIG. 6 may be used to determine azimuth angle $\theta$ of FIG. 5. A third UWB antenna may be included to enable angle of arrival determination in multiple planes (e.g., azimuth angle $\theta$ and elevation angle $\phi$ of FIG. 5 may both be determined). The three UWB antennas in this scenario may form a so-called triplet of ultra-wideband antennas, where each antenna in the triplet is arranged to approximately lie on a respective corner of a right triangle (e.g., the triplet may include UWB antennas 40U-1 and 40U-2 of FIG. 6 and a third antenna located at distance $d_1$ from UWB antenna 40U-1 in a direction perpendicular to the vector between UWB antennas 40U-1 and 40U-2) or using some other predetermined relative positioning. Triplets of UWB antennas 40U may be used to determine angle of arrival in two planes (e.g., to determine both azimuth angle $\theta$ and elevation angle $\phi$ of FIG. 5). Triplets of UWB antennas 40U and/or doublets of UWB antennas 40U (e.g., a pair of antennas such as UWB antennas 40U-1 and 40U-2 of FIG. 6) may be used in device 10 to determine angle of arrival. If desired, different doublets of antennas may be oriented orthogonally with respect to each other in device 10 to recover angle of arrival in two dimensions (e.g., using two or more orthogonal doublets of UWB antennas 40U that each measure angle of arrival in a single respective plane). If desired, device 10 may include only a single UWB antenna (e.g., for detecting the range to an external device using UWB signals conveyed between the UWB antenna and the external device).

Figure 7:
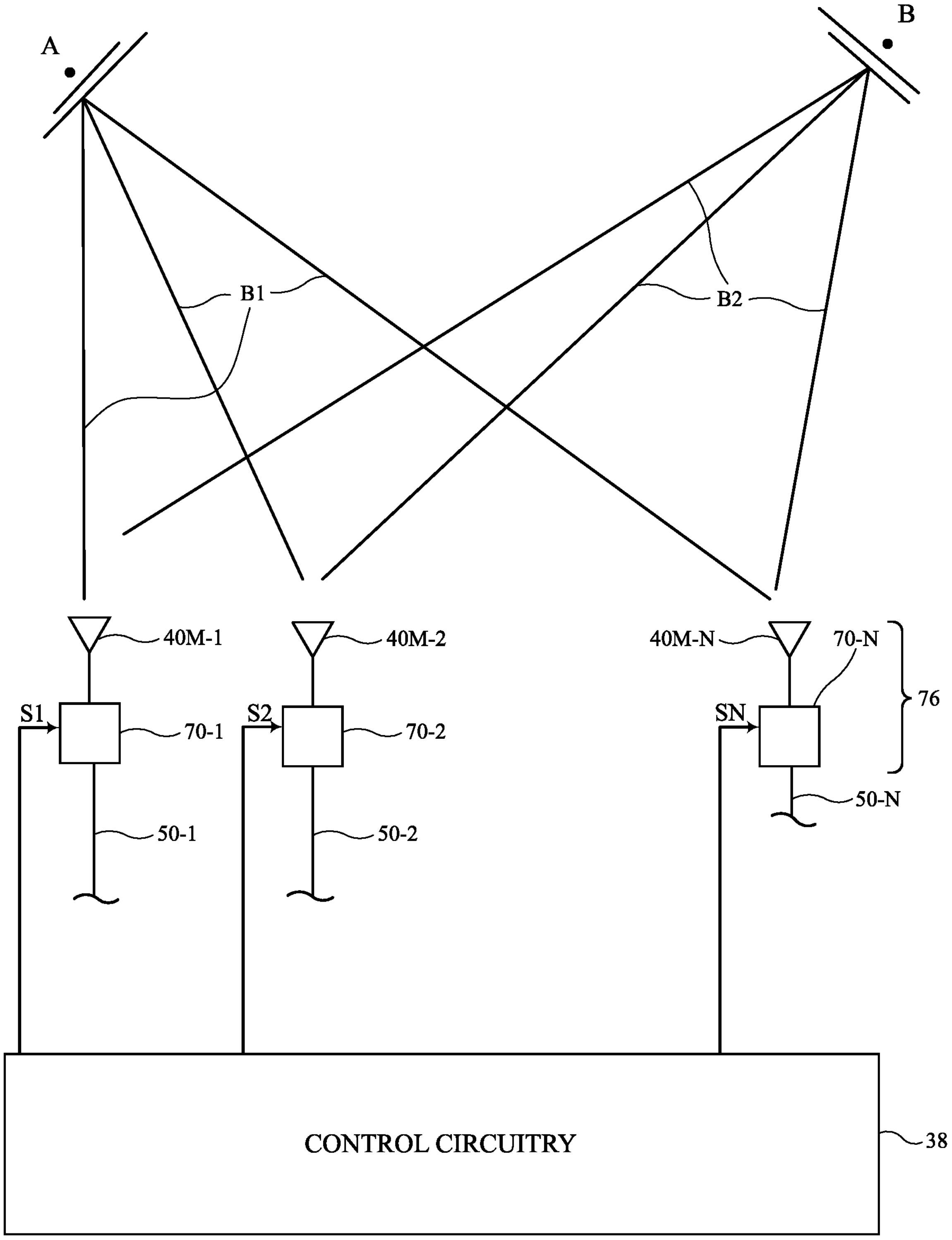
FIG. 7 is a diagram of an illustrative phased antenna array that may be adjusted using control circuitry to direct a beam of signals in accordance with some embodiments.

The antennas 40 in device 10 may also include two or more antennas 40 that convey radio-frequency signals at frequencies greater than 10 GHz. Due to the substantial signal attenuation at frequencies greater than 10 GHz, these antennas may be arranged into one or more corresponding phased antenna arrays. FIG. 7 shows how antennas 40 for handling radio-frequency signals at millimeter and centimeter wave frequencies (sometimes referred to herein as millimeter/centimeter wave antennas 40M) may be formed in a corresponding phased antenna array 76.

As shown in FIG. 7, phased antenna array 76 (sometimes referred to herein as array 76, antenna array 76, or array 76 of millimeter/centimeter wave antennas 40M) may be coupled to radio-frequency transmission line paths 50. For example, a first millimeter/centimeter wave antenna 40M-1 in phased antenna array 76 may be coupled to a first radio-frequency transmission line path 50-1, a second millimeter/centimeter wave antenna 40M-2 in phased antenna array 76 may be coupled to a second radio-frequency transmission line path 50-2, an Nth millimeter/centimeter wave antenna 40M-N in phased antenna array 76 may be coupled to an Nth radio-frequency transmission line path 50-N, etc. While millimeter/centimeter wave antennas 40M are described herein as forming a phased antenna array, the millimeter/centimeter wave antennas 40M in phased antenna array 76 may sometimes also be referred to as collectively forming a single phased array antenna.

Millimeter/centimeter wave antennas 40M in phased antenna array 76 may be arranged in any desired number of rows and columns or in any other desired pattern (e.g., the antennas need not be arranged in a grid pattern having rows and columns). During signal transmission operations, radio-frequency transmission line paths 50 may be used to supply signals (e.g., radio-frequency signals such as millimeter wave and/or centimeter wave signals) from transceiver circuitry 36 (FIG. 2) to phased antenna array 76 for wireless transmission. During signal reception operations, radio-frequency transmission line paths 50 may be used to supply signals received at phased antenna array 76 (e.g., from external wireless equipment or transmitted signals that have been reflected off of external objects) to transceiver circuitry 36 (FIG. 3).

The use of multiple millimeter/centimeter wave antennas 40M in phased antenna array 76 allows beam steering arrangements to be implemented by controlling the relative phases and magnitudes (amplitudes) of the radio-frequency signals conveyed by the antennas. In the example of FIG. 7, millimeter/centimeter wave antennas 40M each have a corresponding radio-frequency phase and magnitude controller 70 (e.g., a first phase and magnitude controller 70-1 disposed on radio-frequency transmission line path 50-1 may control phase and magnitude for radio-frequency signals handled by millimeter/centimeter wave antenna 40M-1, a second phase and magnitude controller 70-2 disposed on radio-frequency transmission line path 50-2 may control phase and magnitude for radio-frequency signals handled by millimeter/centimeter wave antenna 40M-2, an Nth phase and magnitude controller 70-N disposed on radio-frequency transmission line path 50-N may control phase and magnitude for radio-frequency signals handled by millimeter/centimeter wave antenna 40M-N, etc.).

Phase and magnitude controllers 70 may each include circuitry for adjusting the phase of the radio-frequency signals on radio-frequency transmission line paths 50 (e.g., phase shifter circuits) and/or circuitry for adjusting the magnitude of the radio-frequency signals on radio-frequency transmission line paths 50 (e.g., power amplifier and/or low noise amplifier circuits). Phase and magnitude controllers 70 may sometimes be referred to collectively herein as beam steering circuitry (e.g., beam steering circuitry that steers the beam of radio-frequency signals transmitted and/or received by phased antenna array 76).

Phase and magnitude controllers 70 may adjust the relative phases and/or magnitudes of the transmitted signals that are provided to each of the antennas in phased antenna array 76 and may adjust the relative phases and/or magnitudes of the received signals that are received by phased antenna array 76. Phase and magnitude controllers 70 may, if desired, include phase detection circuitry for detecting the phases of the received signals that are received by phased antenna array 76. The term "beam" or "signal beam" may be used herein to collectively refer to wireless signals that are transmitted and received by phased antenna array 76 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 70 are adjusted to produce a first set of phases and/or magnitudes for transmitted radio-frequency signals, the transmitted signals will form a transmit beam as shown by beam B1 of FIG. 7 that is oriented in the direction of point A. If, however, phase and magnitude controllers 70 are adjusted to produce a second set of phases and/or magnitudes for the transmitted signals, the transmitted signals will form a transmit beam as shown by beam B2 that is oriented in the direction of point B. Similarly, if phase and magnitude controllers 70 are adjusted to produce the first set of phases and/or magnitudes, radio-frequency signals (e.g., radio-frequency signals in a receive beam) may be received from the direction of point A, as shown by beam B1. If phase and magnitude controllers 70 are adjusted to produce the second set of phases and/or magnitudes, radio-frequency signals may be received from the direction of point B, as shown by beam B2.

Each phase and magnitude controller 70 may be controlled to produce a desired phase and/or magnitude based on a corresponding control signal S received from control circuitry 38 (e.g., the phase and/or magnitude provided by phase and magnitude controller 70-1 may be controlled using control signal S1, the phase and/or magnitude provided by phase and magnitude controller 70-2 may be controlled using control signal S2, etc.). If desired, the control circuitry may actively adjust control signals S in real time to steer the transmit or receive beam in different desired directions over time. Phase and magnitude controllers 70 may provide information identifying the phase of received signals to control circuitry 38 if desired.

When performing wireless communications using radio-frequency signals at millimeter and centimeter wave frequencies, the radio-frequency signals are conveyed over a line of sight path between phased antenna array 76 and external communications equipment. If the external object is located at point A of FIG. 7, phase and magnitude controllers 70 may be adjusted to steer the signal beam towards point A (e.g., to steer the pointing direction of the signal beam towards point A). Phased antenna array 76 may transmit and receive radio-frequency signals in the direction of point A. Similarly, if the external communications equipment is located at point B, phase and magnitude controllers 70 may be adjusted to steer the signal beam towards point B (e.g., to steer the pointing direction of the signal beam towards point B). Phased antenna array 76 may transmit and receive radio-frequency signals in the direction of point B. In the example of FIG. 7, beam steering is shown as being performed over a single degree of freedom for the sake of simplicity (e.g., towards the left and right on the page of FIG. 7). However, in practice, the beam may be steered over two or more degrees of freedom (e.g., in three dimensions, into and out of the page and to the left and right on the page of FIG. 7). Phased antenna array 76 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

In general, the millimeter/centimeter wave antennas 40M in device 10 used to convey millimeter and centimeter wave signals and one or more UWB antennas 40U in device 10 used to convey UWB signals may be formed using any desired antenna architecture. If desired, the millimeter/centimeter wave antennas 40M in device 10 used to convey millimeter and centimeter wave signals and the UWB antennas 40U in device 10 used to convey UWB signals may each be implemented as patch antennas.

Figure 8:
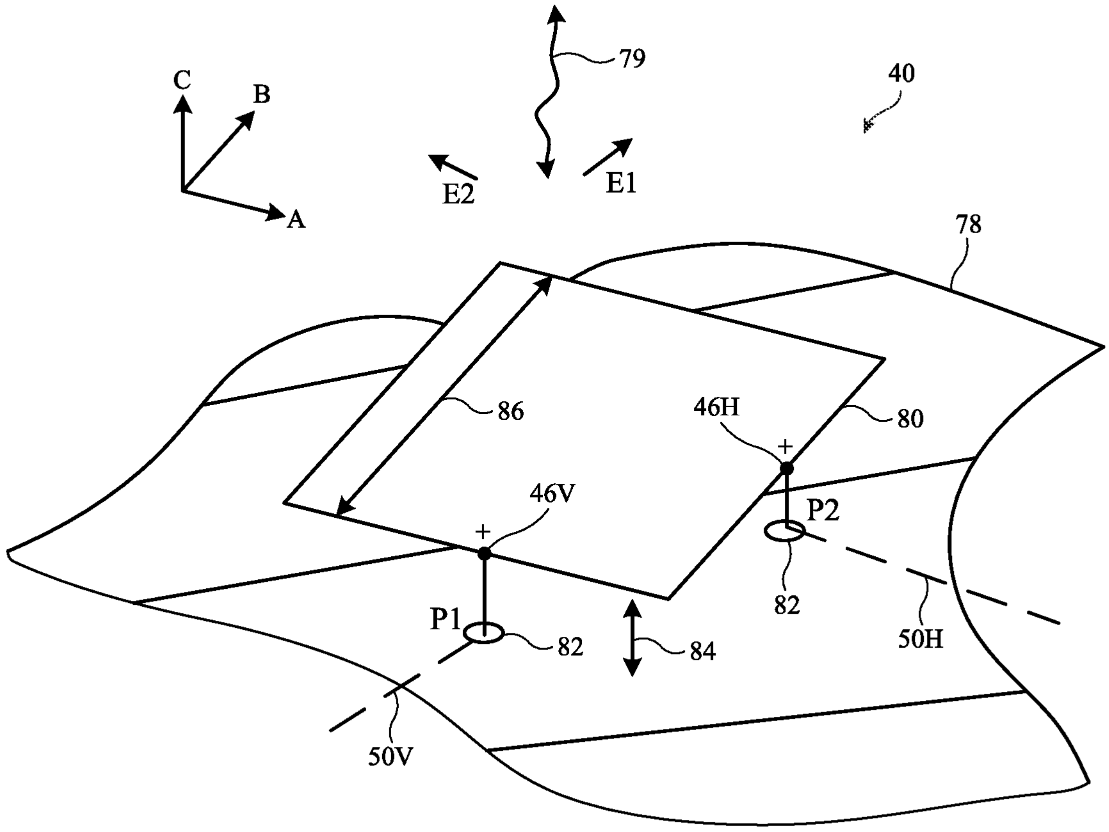
FIG. 8 is a perspective view of an illustrative patch antenna in accordance with some embodiments.

FIG. 8 is a perspective view of an illustrative patch antenna. As shown in FIG. 8, antenna 40 (e.g., a millimeter/centimeter wave 40M or a UWB antenna 40U) may have a patch antenna resonating element 80 that is separated from and parallel to an antenna ground plane such as ground plane 78 (sometimes referred to herein as antenna ground 78). Patch antenna resonating element 80 may lie within a plane such as the A-B plane of FIG. 8 (e.g., the lateral surface area of element 80 may lie in the A-B plane). Patch antenna resonating element 80 may sometimes be referred to herein as patch 80, patch element 80, patch resonating element 80, antenna resonating element 80, or resonating element 80.

Ground plane 78 may lie within a plane that is parallel to the plane of patch element 80. Patch element 80 and ground plane 78 may therefore lie in separate parallel planes that are separated by a distance 84. Patch element 80 and ground plane 78 may be formed from conductive traces patterned on a dielectric substrate.

The length of the sides of patch element 80 may be selected so that antenna 40 resonates at desired operating frequencies. For example, one or more sides of patch element 80 may have a length 86 that is approximately equal to half the wavelength of the signals conveyed by antenna 40 (e.g., the effective wavelength given the dielectric properties of the materials surrounding patch element 80). In one suitable arrangement, length 86 may be between 0.8 mm and 1.2 mm (e.g., approximately 1.1 mm) for covering a millimeter wave frequency band between 57 GHz and 70 GHz or between 1.6 mm and 2.2 mm (e.g., approximately 1.85 mm) for covering a millimeter wave frequency band between 37 GHz and 41 GHz, as just two examples.

The example of FIG. 8 is merely illustrative. Patch element 80 may have a square shape in which all the sides of patch element 80 are the same length or may have a different (non-square) rectangular shape. Patch element 80 may be formed in other shapes having any desired number of straight and/or curved edges. If desired, patch element 80 and ground plane 78 may have different shapes and relative orientations.

To enhance the polarizations handled by antenna 40, antenna 40 may be provided with multiple antenna feeds. As shown in FIG. 8, antenna 40 may have a first antenna feed at antenna port P1 that is coupled to a first radio-frequency transmission line path 50 (FIG. 3) such as transmission line path 50V. Antenna 40 may also have a second feed at antenna port P2 that is coupled to a second radio-frequency transmission line path 50 such as transmission line path 50H. The first antenna feed may have a first ground feed terminal coupled to ground plane 78 (not shown in FIG. 8 for the sake of clarity) and a first positive antenna feed terminal 46V coupled to patch element 80. The second antenna feed may have a second ground feed terminal coupled to ground plane 78 (not shown in FIG. 8 for the sake of clarity) and a second positive antenna feed terminal 46H on patch element 80.

Holes or openings such as openings 82 may be formed in ground plane 78. Transmission line path 50V may include a vertical conductor (e.g., a conductive through-via, conductive pin, metal pillar, solder bump, combinations of these, or other vertical conductive interconnect structures) that extends through opening 68 to positive antenna feed terminal 46V on patch element 80. Transmission line path 50H may include a vertical conductor that extends through opening 82 to positive antenna feed terminal 46H on patch element 80. This example is merely illustrative and, if desired, other transmission line structures may be used (e.g., coaxial cable structures, stripline transmission line structures, etc.).

When using the first antenna feed associated with port P1, antenna 40 may transmit and/or receive radio-frequency signals having a first polarization (e.g., the electric field E1 of antenna signals 79 associated with port P1 may be oriented parallel to the B-axis in FIG. 8). When using the antenna feed associated with port P2, antenna 40 may transmit and/or receive radio-frequency signals having a second polarization (e.g., the electric field E2 of antenna signals 79 associated with port P2 may be oriented parallel to the A-axis of FIG. 8 so that the polarizations associated with ports P1 and P2 are orthogonal to each other).

One of ports P1 and P2 may be used at a given time so antenna 40 operates as a single-polarization antenna or both ports may be operated at the same time so antenna 40 operates with other polarizations (e.g., as a dual-polarization antenna, a circularly-polarized antenna, an elliptically-polarized antenna, etc.). If desired, the active port may be changed over time so antenna 40 can switch between covering vertical or horizontal polarizations at a given time. Ports P1 and P2 may be coupled to different phase and magnitude controllers 70 (FIG. 7) or may both be coupled to the same phase and magnitude controller 70. If desired, ports P1 and P2 may both be operated with the same phase and magnitude at a given time (e.g., when antenna 40 acts as a dual-polarization antenna). If desired, the phases and magnitudes of radio-frequency signals conveyed over ports P1 and P2 may be controlled separately and varied over time so antenna 40 exhibits other polarizations (e.g., circular or elliptical polarizations).

If care is not taken, antennas 40 such as dual-polarization patch antennas of the type shown in FIG. 8 may have insufficient bandwidth for covering an entirety of a frequency band of interest (e.g., a frequency band at frequencies greater than 10 GHz). For example, in scenarios where antenna 40 is configured to cover a millimeter wave communications band between 37 GHz and 40 GHz, patch element 80 as shown in FIG. 8 may have insufficient bandwidth to cover the entirety of the frequency range between 37 GHz and 40 GHz or 43.5 GHz. If desired, antenna 40 may include one or more parasitic antenna resonating elements that serve to broaden the bandwidth of antenna 40.

The parasitic antenna resonating element(s) may overlap patch element 80 and/or be coplanar with patch element 80. The parasitic antenna resonating element(s) may sometimes be referred to herein as parasitic resonating elements, parasitic antenna elements, parasitic elements, parasitic patches, parasitic patch elements, parasitic conductors, parasitic structures, parasitics, or patches. The parasitic elements are not directly connected to an antenna feed, whereas patch element 80 is directly fed via transmission line paths 50V and 50H and is directly connected to positive antenna feed terminals 46V and 46H (e.g., positive antenna feed terminals 46V and 46H are located on patch element 80). The parasitic element(s) may create constructive perturbations of the electromagnetic field generated by patch element 80, creating new resonance(s) for antenna 40. This may serve to broaden the overall bandwidth of antenna 40. Additionally or alternatively, the parasitic element(s) may capacitively load patch element 80 to effectively (electrically) extend the electrical length of patch element 80 (e.g., length 86) for covering lower frequencies than in the absence of the parasitic element(s).

If desired, antenna 40 of FIG. 8 may be formed on a dielectric substrate (not shown in FIG. 8 for the sake of clarity). The dielectric substrate may be, for example, a rigid or printed circuit board or other dielectric substrate. The dielectric substrate may include multiple stacked dielectric layers (e.g., multiple layers of printed circuit board substrate such as multiple layers of fiberglass-filled epoxy, multiple layers of ceramic substrate, etc.). Ground plane 78, patch element 80, and the parasitic element(s) may be formed from conductive traces on different layers of the dielectric substrate.

The example of FIG. 8 is merely illustrative. Antenna 40 may have any desired number of feeds. Other feeding arrangements may be used. Antenna 40 may include any desired type of antenna resonating element structures. If desired, antenna 40 may include multiple vertically-stacked patch elements 80. Each of the vertically-stacked patch elements 80 may radiate in a respective frequency band. By forming each patch element 80 with a respective length 86, antenna 40 may be configured to cover multiple frequency bands. If desired, one or more conductive vias may couple (short) patch element 80 to ground plane 78. This may configure antenna 40 to form an inverted-F antenna (e.g., a planar inverted-F antenna), where patch element 80 forms an inverted-F antenna radiating element (e.g., a planar inverted-F antenna radiating element arm). In these configurations, the radiating element may have a length approximately equal to one-quarter the effective wavelength of operation of the antenna, for example.

Figure 9:
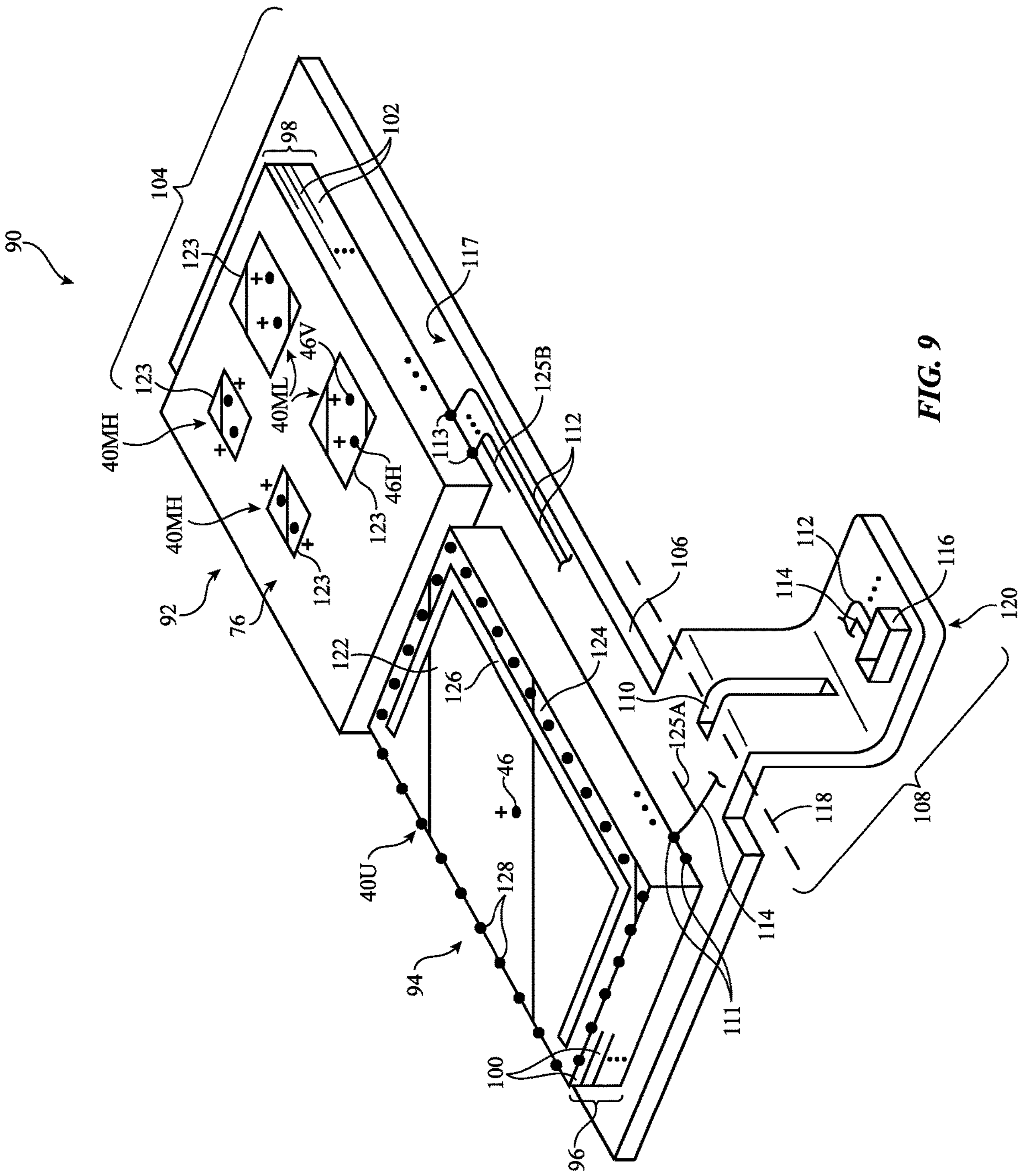
FIG. 9 is a perspective view of an illustrative antenna system having multiple antenna modules mounted to a folded flexible printed circuit in accordance with some embodiments.

To help minimize space consumption, transmission line routing complexity, and signal path loss, one or more millimeter/centimeter wave antennas 40M and one or more UWB antennas 40U may be mounted to a common (shared) substrate. FIG. 9 is a perspective view of an illustrative antenna system 90 in which one or more millimeter/centimeter wave antennas 40M and one or more UWB antennas 40U are mounted to a common substrate.

As shown in FIG. 9, antenna system 90 (sometimes also referred to as antenna package 90 or module package 90) may include a flexible printed circuit 106. Flexible printed circuit 106 may have a first portion such as main body 104 and a second portion such as tail 108 extending away from main body 104 (e.g., main body 104 may be larger and wider than tail 108). Tail 108 may be bent or folded with respect to main body 104 around/about one or more axes such as axis 118. If desired, tail 108 may include one or more openings such as notch 110 (e.g., extending along or parallel to a longitudinal axis of tail 108). Notch 110 may, for example, help flexible printed circuit 106 to bend around axis 118 without producing excessive stress or cracking in flexible printed circuit 106.

Multiple antenna modules may be mounted to main body 104 of flexible printed circuit 106 (e.g., flexible printed circuit 106 may form a shared or common substrate for multiple antenna modules to form a single integrated multi-module antenna package). For example, as shown in FIG. 9, antenna system 90 may include at least a first antenna module 92 and a second antenna module 94 mounted to main body 104 of flexible printed circuit 106.

Antenna module 92 may include a phased antenna array 76. Phased antenna array 76 may include two or more millimeter/centimeter wave antennas 40M such as a first set of millimeter/centimeter wave antennas 40ML that cover a relatively low millimeter/centimeter wave frequency band and a second set of millimeter/centimeter wave antennas 40MH that cover a relatively high millimeter/centimeter wave frequency band. Antenna module 92 is sometimes also referred to herein as millimeter/centimeter wave antenna module 92 or simply as array module 92.

Antenna module 94 may include one or more UWB antennas 40U. Antenna module 94 may include a single UWB antenna 40U, may include two UWB antennas (e.g., a doublet of UWB antennas), or may include three UWB antennas (e.g., a triplet of UWB antennas). Implementations in which antenna module 94 includes a single UWB antenna 40U are described herein as an example. In these implementations, the single UWB antenna 40U on antenna module 94 may form part of a doublet of UWB antennas (e.g., with another UWB antenna located elsewhere in device 10 outside of antenna system 90), may form part of a triplet of UWB antennas (e.g., with two other UWB antennas located elsewhere in device 10 outside of antenna system 90), or may not form part of a doublet or triplet of UWB antennas (e.g., may be used to detect the range to an external object using UWB signals). Antenna module 94 is sometimes also referred to herein as UWB antenna module 94 or simply as UWB module 94.

UWB module 94 may include a dielectric substrate such as substrate 96. Substrate 96 may include one or more stacked dielectric layers 100. Dielectric layers 100 may include layers of printed circuit board material (e.g., layers of rigid printed circuit board material or flexible printed circuit board material such as polyimide), layers of ceramic, layers of semiconductor materials, layers of plastic, and/or layers of other dielectric materials.

UWB module 94 may include one or more layers of conductive traces (e.g., metallization layers) on one or more dielectric layers 100. The layers of conductive traces may be used to form some or all of the antenna resonating element for UWB antenna 40U, the antenna ground for UWB antenna 40U (e.g., ground traces), the signal conductor 52 (FIG. 3) for the radio-frequency transmission line path 50 coupled to UWB antenna 40U, the ground conductor 54 (FIG. 3) for the radio-frequency transmission line path 50 coupled to UWB antenna 40U, landing pads, contact pads, and/or other conductive portions of UWB antenna 40U.

If desired, conductive through vias may extend through one or more dielectric layers 100 to couple different layers of conductive traces in UWB module 94 together and/or to couple one or more of the layers of conductive traces in UWB module 94 to conductive traces on lateral surface 117 of flexible printed circuit 106 (e.g., contact pads, landing pads, signal traces that form part of the radio-frequency transmission line path for UWB antenna 40U, ground traces that form part of the antenna ground for UWB antenna 40U, ground traces that form part of the radio-frequency transmission line path for UWB antenna 40U, etc.).

UWB module 94 may be surface-mounted to lateral surface 117 of flexible printed circuit 106 (e.g., within main body 104). For example, conductive traces and/or pads on the bottom surface of substrate 96 may be coupled to conductive traces and/or pads on lateral surface 117 of flexible printed circuit 106 by solder such as solder balls 111 (e.g., using a surface mount technology (SMT) process). Solder balls 111 may form an electrical connection between conductive traces, pads, and/or through vias on UWB module 94 and the conductive traces and/or pads on lateral surface 117 of flexible printed circuit 106. At the same time, solder balls 111 may mechanically attach, affix, secure, or adhere UWB module 94 to lateral surface 117 of flexible printed circuit 106.

The conductive traces and/or pads on lateral surface 117 of flexible printed circuit 106 and overlapping UWB module 94 may be coupled to signal traces 114 in flexible printed circuit 106. Signal traces 114 may form part of the signal conductor 52 in the radio-frequency transmission line path 50 (FIG. 3) that feeds the UWB antenna 40U on UWB module 94. Signal traces 114 may extend from UWB module 94 on main body 104 to connector 116 on tail 108 (e.g., through part of main body 104 and through tail 108). Connector 116 may be a radio-frequency board-to-board (B2B) connector, for example. Connector 116 may be mounted (e.g., surface-mounted) to lateral surface 117 of flexible printed circuit 106 or to the opposing lateral surface 120 of flexible printed circuit 106 (within tail 108).

The antenna resonating element of UWB antenna 40U may include a radiating arm such as arm 122. Arm 122 may be formed from a patch of conductive traces on a dielectric layer 100 of substrate 96 (e.g., the uppermost or top dielectric layer 100 of substrate 96). Arm 122 may, for example, form a patch element 80 (FIG. 8) for UWB antenna 40U. UWB antenna 40U may include ground traces underlying arm 122. The ground traces may be formed from conductive traces on one or more dielectric layers 100 of substrate 96, on lateral surface 117 of flexible printed circuit 106, and/or within flexible printed circuit 106.

The positive antenna feed terminal 46 of UWB antenna 40U may be coupled to arm 122. One or more conductive vias (not shown) may extend through one or more dielectric layers 100 in substrate 96 to couple positive antenna feed terminal 46 to signal traces 114 on flexible printed circuit 106. If desired, signal traces 114 may include one or more impedance matching segments such as transmission line stub 125A, conductive traces having different widths/thicknesses, etc. The impedance matching segment(s) may be disposed at locations on flexible printed circuit 106 that overlap substrate 96 and/or that are non-overlapping with respect to substrate 96. The impedance matching segment(s) may help to match the impedance of signal traces 114 to the impedance of UWB antenna 40U (e.g., in the UWB band (s)). The dimensions of arm 122 (e.g., the perimeter and/or length of arm 122) may be selected to configure arm 122 to resonate in one or more UWB bands. Arm 122 may have a rectangular shape or may have any other desired shape having any desired number of straight and/or curved edges extending in any desired directions.

If desired, an electromagnetic shielding (guard) ring such as grounded shielding ring 124 may laterally surround arm 122 on substrate 96. Grounded shielding ring 124 may be formed from conductive traces (ground traces) on one or more dielectric layers 100 of substrate 96. The conductive traces of grounded shielding ring 124 may be shorted to underlying ground traces by fences of conductive vias 128 extending through substrate 96. Each conductive via 128 may be separated from one or more adjacent conductive vias 128 by a sufficiently narrow distance such that the fence of conductive vias 128 appears as an open circuit (infinite impedance) to antenna currents in the UWB frequency band(s) handled by UWB antenna 40U. As an example, each conductive via 128 in the fence may be separated from one or more adjacent conductive vias 128 by one-sixth of a wavelength covered by UWB antenna 40U, one-eighth of a wavelength covered by UWB antenna 40U, one-tenth of a wavelength covered by UWB antenna 40U, one-fifteenth of a wavelength covered by UWB antenna 40U, less than one-fifteenth of a wavelength covered by UWB antenna 40U, etc. Grounded shielding ring 124 may serve to isolate and shield UWB antenna 40U from electromagnetic interference (e.g., from the adjacent array module 92). Grounded shielding ring 124, conductive vias 128, and the underlying ground traces on substrate 96 and/or flexible printed circuit 106 may collectively form the antenna ground for UWB antenna 40U.

If desired, one or more edges of arm 122 may be shorted or coupled to grounded shielding ring 124 (e.g., to implement arm 122 as a planar inverted-F antenna resonating element arm). In this example, as shown in FIG. 9, arm 122 extends from an edge shorted to shielding ring 124 to an opposing edge defined by slot 126 (e.g., slot 126 may be a C-shaped slot that separates the three un-shorted edges of arm 122 from grounded shielding ring 124). This is merely illustrative. If desired, slot 126 may separate every edge of arm 122 from grounded shielding ring 124 (e.g., arm 122 may be formed from a conductive patch that is completely surrounded by slot 126 and floating with respect to grounded shielding ring 124). If desired. UWB antenna 40U may include multiple arms 122 for covering different UWB bands (e.g., extending from opposing sides of a fence of conductive vias or extending from different sides of grounded shielding ring 124). In general, UWB antenna 40U may have any desired type of antenna resonating element on substrate 96 (e.g., an inverted-F antenna resonating element, a planar inverted-F antenna resonating element, a patch antenna resonating element, a dipole antenna resonating element, a monopole antenna resonating element, a slot antenna resonating element, combinations of these, etc.).

Array module 92 may include a dielectric substrate such as substrate 98. Substrate 98 is a different/separate substrate than substrate 96 in UWB module 94. As such, substrate 98 is laterally separated from substrate 96 at flexible printed circuit 106 by a gap or non-zero distance. Substrate 98 may be formed from the same material as substrate 96 or may be formed from a different material than substrate 96. Substrate 98 may include one or more stacked dielectric layers 102. Dielectric layers 102 may include layers of printed circuit board material (e.g., layers of rigid printed circuit board material or flexible printed circuit board material such as polyimide), layers of ceramic, layers of semiconductor materials, layers of plastic, and/or layers of other dielectric materials.

Array module 92 may include one or more layers of conductive traces (e.g., metallization layers) on one or more dielectric layers 102. The layers of conductive traces may be used to form some or all of the antenna resonating element for the millimeter/centimeter wave antennas 40MH and 40ML in phased antenna array 76, the antenna ground for millimeter/centimeter wave antennas 40MH and 40ML (e.g., ground traces), the signal conductor 52 (FIG. 3) of the radio-frequency transmission line paths 50 coupled to millimeter/centimeter wave antennas 40MH and 40ML, the ground conductor 54 (FIG. 3) of the radio-frequency transmission line paths 50 coupled to millimeter/centimeter wave antennas 40MH and 40ML, landing pads, contact pads, and/or other conductive portions of millimeter/centimeter wave antennas 40MH and 40ML.

If desired, conductive through vias (not shown) may extend through one or more dielectric layers 102 to couple different layers of conductive traces in array module 92 together and/or to couple one or more of the layers of conductive traces in array module 92 to conductive traces on lateral surface 117 of flexible printed circuit 106 (e.g., contact pads, landing pads, signal traces that form part of the radio-frequency transmission line path for millimeter/centimeter wave antennas 40MH and 40ML, ground traces that form part of the antenna ground for millimeter/centimeter wave antennas 40MH and 40ML, ground traces that form part of the radio-frequency transmission line paths for millimeter/centimeter wave antennas 40MH and 40ML, etc.).

Array module 92 may be surface-mounted to lateral surface 117 of flexible printed circuit 106 (e.g., within main body 104). For example, conductive traces and/or pads on the bottom surface of dielectric substrate 98 may be coupled to conductive traces and/or pads on lateral surface 117 of flexible printed circuit 106 by solder such as solder balls 113 (e.g., using a surface mount technology (SMT) process). Solder balls 113 may form an electrical connection between conductive traces, pads, and/or through vias on array module 92 and the conductive traces and/or pads on lateral surface 117 of flexible printed circuit 106. At the same time, solder balls 113 may mechanically attach, affix, secure, or adhere array module 92 to lateral surface 117 of flexible printed circuit 106.

The conductive traces and/or pads on lateral surface 117 of flexible printed circuit 106 and overlapping array module 92 may be coupled to signal traces 112 in flexible printed circuit 106. Signal traces 112 may form part of the signal conductor 52 in the radio-frequency transmission line paths 50 (FIG. 3) that feed the millimeter/centimeter wave antennas 40MH and 40ML on array module 92. Signal traces 112 may extend from array module 92 on main body 104 to connector 116 on tail 108 (e.g., through part of main body 104 and through tail 108).

The antenna resonating element of each of millimeter/centimeter wave antennas 40MH and 40ML may be formed from a respective conductive trace 123 on substrate 98. Each conductive trace 123 may be disposed on the same dielectric layer 102 of substrate 98 (e.g., the uppermost or top dielectric layer 102 of substrate 98) or on different dielectric layers 102. Each conductive trace 123 may, for example, form a patch element 80 (FIG. 8) for the corresponding millimeter/centimeter wave antenna 40MH or 40ML. Millimeter/centimeter wave antennas 40MH and 40ML may include ground traces underlying conductive traces 123. The ground traces may be formed from conductive traces on one or more dielectric layers 102 of substrate 98, on lateral surface 117 of flexible printed circuit 106, and/or within flexible printed circuit 106.

Each conductive trace 123 may be coupled to a single positive antenna feed terminal 46 or multiple positive antenna feed terminals such as positive antenna feed terminals 46V and 46H (e.g., for covering multiple polarizations). One or more conductive vias (not shown) may extend through one or more dielectric layers 102 in substrate 98 to couple the positive antenna feed terminal(s) 46 on each conductive trace 123 to corresponding signal traces 112 on flexible printed circuit 106. If desired, signal traces 112 may include one or more impedance matching segments such as transmission line stub 125B, conductive traces having different widths/thicknesses, etc. The impedance matching segment(s) may be disposed at locations on flexible printed circuit 106 that overlap substrate 98 and/or that are non-overlapping with respect to substrate 98. The impedance matching segment(s) may help to match the impedance of signal traces 112 to the impedance of conductive traces 123 (e.g., in the millimeter/centimeter wave band(s)).

The dimensions of conductive traces 123 may be selected to configure conductive traces 123 to resonate in one or more millimeter/centimeter wave bands. For example, the conductive traces 123 in millimeter/centimeter wave antennas 40ML may be larger than the conductive traces 123 in millimeter/centimeter wave antennas 40MH to configure millimeter/centimeter wave antennas 40ML to cover lower frequencies than millimeter/centimeter wave antennas 40MH. If desired, one or more grounded shielding rings (not shown) may be disposed on substrate 98 around phased antenna array 76.

The example of FIG. 9 is merely illustrative. If desired, phased antenna array 76 may include only millimeter/centimeter wave antennas 40MH, only millimeter/centimeter wave antennas 40ML, more than two millimeter/centimeter wave antennas 40MH, more than two millimeter/centimeter wave antennas 40ML, only a single millimeter/centimeter wave antenna 40ML, only a single millimeter/centimeter wave antenna 40MH, and/or conductive traces 123 may be arranged in any desired pattern. In general, millimeter/centimeter wave antennas 40MH and 40ML may have any desired type(s) of antenna resonating element having any desired shape(s) on substrate 98 (e.g., an inverted-F antenna resonating element, a planar inverted-F antenna resonating element, a patch antenna resonating element, a dipole antenna resonating element, a monopole antenna resonating element, a slot antenna resonating element, combinations of these, etc.).

Figure 10:
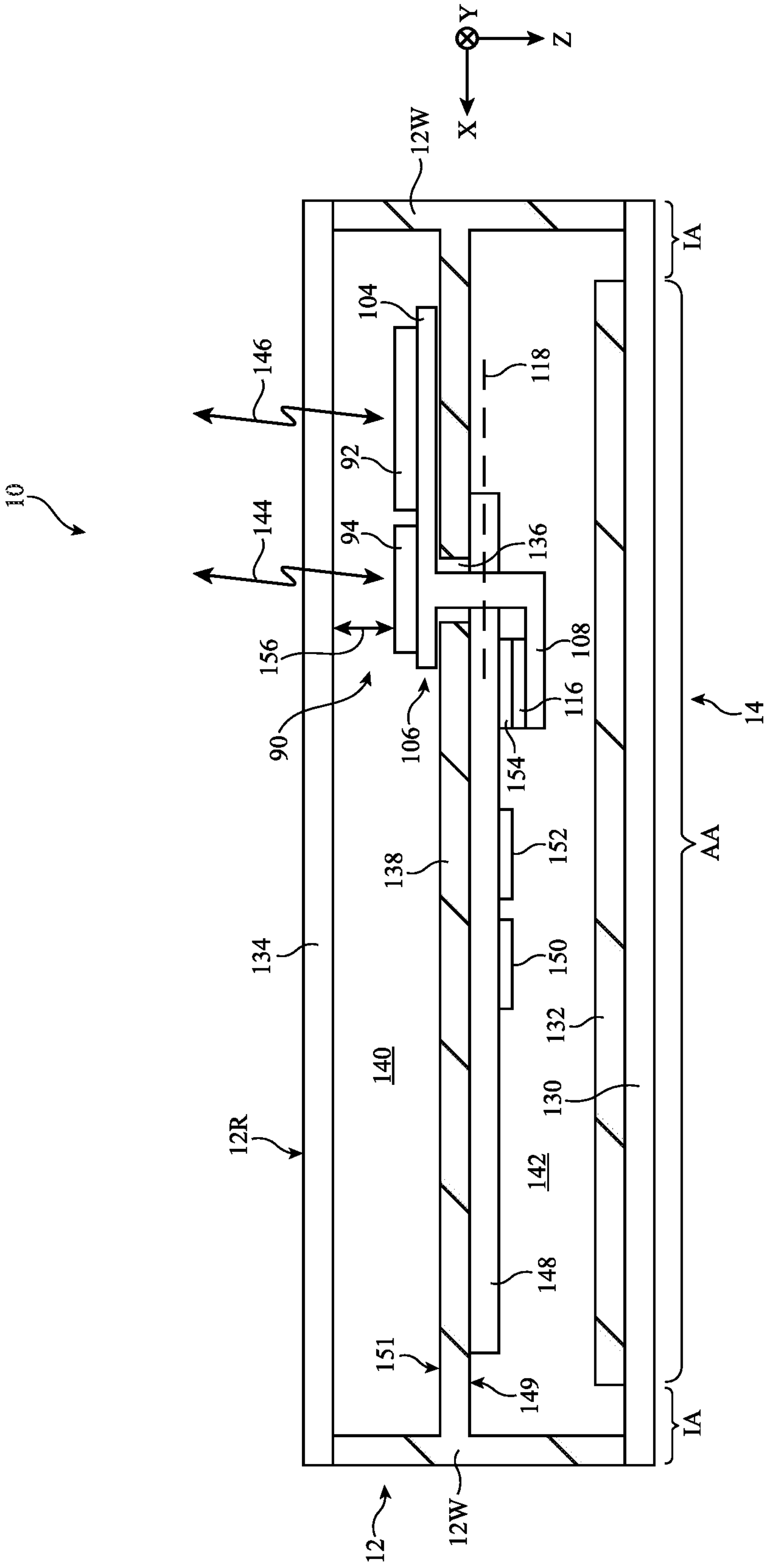
FIG. 10 is a cross-sectional side view showing how an illustrative antenna system having multiple antenna modules mounted to a folded flexible printed circuit may be integrated into an electronic device housing in accordance with some embodiments.

By integrating both UWB module 94 and array module 92 into the same antenna system 90, transmission line routing complexity can be minimized within device 10 and device 10 can be configured to convey radio-frequency signals in UWB bands and millimeter/centimeter wave bands while consuming as little volume in device 10 as possible. If desired, antenna system 90 may be integrated into the housing of device 10 such that the antennas in both UWB module 94 and array module 92 radiate through the rear face of device 10. FIG. 10 is a cross-sectional side view showing how antenna system 90 may be integrated into the housing of device 10.

As shown in FIG. 10, peripheral conductive housing structures 12W may extend around the lateral periphery of device 10 (e.g., as measured in the X-Y plane of FIG. 10). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10.

Display 14 may have a display module such as display module 132 (sometimes referred to as a display panel). Display module 132 may include pixel circuitry, touch sensor circuitry, force sensor circuitry, and/or any other desired circuitry for forming active area AA of display 14. Display 14 may include a dielectric cover layer such as display cover layer 130 that overlaps display module 132. Display cover layer 130 may include plastic, glass, sapphire, ceramic, and/or any other desired dielectric materials. Display module 132 may emit image light and may receive sensor input (e.g., touch and/or force sensor input) through display cover layer 130. Display cover layer 130 and display 14 may be mounted to peripheral conductive housing structures 12W. The lateral area of display 14 that does not overlap display module 132 may form inactive area IA of display 14.

As shown in FIG. 10, rear housing wall 12R may be mounted to peripheral conductive housing structures 12W (e.g., opposite display 14). Rear housing wall 12R may include a dielectric cover layer such as dielectric cover layer 134. Dielectric cover layer 134 may include glass, plastic, sapphire, ceramic, one or more dielectric coatings, or other dielectric materials. If desired, conductive material may be layered onto some of the interior lateral surface of dielectric cover layer 134. Dielectric cover layer 134 may extend across an entirety of the width of device 10 and/or an entirety of the length of device 10. If desired, dielectric cover layer 134 may be provided with pigmentation and/or an opaque masking layer (e.g., an ink layer) that helps to hide the interior of device 10 from view.

Housing 12 of device 10 may also include one or more conductive support plates (layers) that are vertically interposed between display 14 and rear housing wall 12R. For example, housing 12 may include a conductive support plate such as mid-chassis 138 (sometimes referred to herein as conductive support plate 138, conductive mid-plate 138, conductive plate 138, or interior conductive housing wall 138). Mid-chassis 138 may extend across some or all of the length and/or width of device 10. For example, mid-chassis 138 may extend from a first sidewall of device 10 (e.g., formed from a first segment of peripheral conductive housing structures 12W at a first side of device 10) to a second sidewall of device 10 (e.g., formed from a second segment of peripheral conductive housing structures 12W at a second side of device 10). If desired, mid-chassis 138 may be formed from an integral portion of peripheral conductive housing structures 12W that extends across the width and/or length of device 10 (e.g., mid-chassis 138 and peripheral conductive housing structures 12W may be formed from integral portions of the same single piece of machined metal). Alternatively, mid-chassis 138 may be welded or otherwise coupled between peripheral conductive housing structures 12W.

Mid-chassis 138 may have a first lateral surface 151 facing rear housing wall 12R. Mid-chassis 138 may have an opposing second lateral surface 149 facing display 14. First lateral surface 151 of mid-chassis 138 may be separated from dielectric cover layer 134 by a first non-zero distance. In this way, mid-chassis 138, dielectric cover layer 134, and peripheral conductive housing structures 12W may form or define a first interior cavity 140 of device 10 (e.g., facing rear housing wall 12R and the rear face of device 10). Interior cavity 140 is sometimes also referred to herein as interior volume 140. At the same time, mid-chassis 138, display 14, and peripheral conductive housing structures 12W may form or define a second interior cavity 142 of device 10 (e.g., facing display 14 and the front face of device 10). Interior cavity 142 is sometimes also referred to herein as interior volume 142. Mid-chassis 138 separates interior cavity 140 from interior cavity 142.

As shown in FIG. 10, device 10 may include a logic board such as logic board 148 (e.g., a main logic board for device 10). Logic board 148 may be a rigid printed circuit board, an integrated circuit package or substrate, a flexible printed circuit board, or another type of logic board. One or more components may be mounted to logic board 148. The components mounted to logic board 148 may include some or all of control circuitry 38, input-output devices 28, and/or radio-frequency transceiver circuitry 36 (FIG. 2), as examples. A connector such as connector 154 may be mounted to logic board 148. Connector 154 may, for example, be a radio-frequency B2B connector.

The components mounted to logic board 148 may include radio-frequency components such as UWB components 150 that support wireless communications using UWB module 94 and millimeter/centimeter wave components 152 that support wireless communications using array module 92. UWB components 150 and 152 may include some or all of radio-frequency transceiver circuitry 36 (FIG. 2), baseband circuitry, amplifier circuitry, filter circuitry, front end circuitry (e.g., one or more front end modules), switching circuitry, mixer circuitry, analog-to-digital converter circuitry, digital-to-analog converter circuitry, one or more radio-frequency integrated circuits (RFICs), and/or any other desired circuitry that transmits signals to and/or receives signals from UWB module 94 or array module 92. Millimeter/centimeter wave components 152 may, for example, include phase and magnitude controllers 70 (FIG. 7) for performing beam steering using the antennas on array module 92. Logic board 148 may include radio-frequency transmission lines (e.g., from radio-frequency transmission line paths 50 of FIG. 3) coupled between connector 154 and UWB components 150 and coupled between connector 154 and millimeter/centimeter wave components 152.

Logic board 148 may be mounted to (e.g., layered onto) lateral surface 149 of mid-chassis 138 (e.g., facing display 14). Put differently, logic board 148 may be vertically interposed between mid-chassis 138 and display 14. This may, for example, minimize the routing complexity and signal loss between logic board 148 and display 14 (e.g., a display driver for display 14) and/or may maximize the volume of interior cavity 140 (e.g., for accommodating large components such as a battery in device 10).

Antenna system 90 may also be mounted to mid-chassis 138. For example, as shown in FIG. 10, main body 104 of the flexible printed circuit 106 in antenna system 90 may be mounted to or layered onto lateral surface 151 of mid-chassis 138 (e.g., mid-chassis 138 may be vertically interposed between at least part of logic board 148 and at least part of main body 104). This disposes UWB module 94 and array module 92 within interior cavity 140 and facing rear housing wall 12R. The antenna(s) on UWB module 94 may convey UWB signals through rear housing wall 12R, as shown by arrow 144 (e.g., for identifying the distance and/or angle-of-arrival to an external device within the hemisphere overlapping the rear face of device 10). At the same time, the antenna(s) on array module 92 may convey millimeter/centimeter wave signals through rear housing wall 12R, as shown by arrow 146 (e.g., for performing high data rate communications in one or more 5G NR FR2 bands with external equipment within the hemisphere overlapping the rear face of device 10).

When flexible printed circuit 106 is mounted to mid-chassis 138, the outermost (top) lateral surface of UWB module 94 is separated from dielectric cover layer 134 by a non-zero distance 156 (e.g., a uniform across the lateral area of UWB module 94). Distance 156 may be 0.5-5 mm, for example. Similarly, the outermost (top) lateral surface of array module 92 may be separated from dielectric cover layer 134 by a non-zero distance (e.g., 0.05-5 mm). The non-zero distance may be uniform across the lateral area of array module 92. The non-zero distance may be equal to non-zero distance 156 or may be a different non-zero distance.

This may serve to form a smooth impedance transition between the antennas on UWB module 94 and array module 92 and free space through dielectric cover layer 134, thereby minimizing undesired signal reflections and maximizing antenna performance (e.g., efficiency). Separating modules 92 and 94 from dielectric cover layer 134 rather than pressing the modules against dielectric cover layer 134 or adhering the modules to dielectric cover layer 134 may allow rear housing wall 12R to be easily removed from device 10 (e.g., for repairing or replacing components inside of device 10 during the operating life of device 10).

As shown in FIG. 10, mid-chassis 138 may include one or more openings such as opening 136. Opening 136 is sometimes also referred to herein as slot 136, gap 136, notch 136, or hole 136. Opening 136 extends from lateral surface 151 to lateral surface 149, thereby forming or providing a routing port or tunnel between interior cavity 140 and interior cavity 142.

Antenna system 90 (e.g., flexible printed circuit 106) may be integrated into mid-chassis 138 and may extend between interior cavities 140 and 142. For example, as shown in FIG. 10, tail 108 of flexible printed circuit 106 may be folded around one or more axes such as axis 118 to extend downwards from main body 104 at lateral surface 151 of mid-chassis 138 (within interior cavity 140), through opening 136, and into interior cavity 142. In other words, tail 108 may be folded through opening 136 and around mid-chassis 138. Tail 108 may fold around axis 118 by 180 degrees, 90 degrees, 45 degrees, 90-180 degrees, 90-225 degrees, or other angles. If desired, tail 108 may fold around multiple parallel axes (e.g., parallel to axis 118) by 45-180 degrees or other angles. If desired, tail 108 may be folded around multiple orthogonal axes. In general, tail 108 may be folded in any desired manner. Tail 108 may be folded onto, over, and/or under logic board 148 to couple the connector 116 on tail 108 to the connector 154 on logic board 148 (e.g., connector 116 may mate with connector 154). This serves to couple signal traces 114 and 112 (FIG. 8) on flexible printed circuit 106 and thus the UWB antenna(s) on UWB module 94 and the millimeter/centimeter wave antenna(s) on array module 92 to UWB components 150 and millimeter/centimeter wave components 152 on logic board 148, respectively.

For example, the signal conductor 52 of the radio-frequency transmission line path(s) 50 (FIG. 3) for the UWB antenna(s) 40U on UWB module 94 may be formed from signal traces 114 (FIG. 8) on flexible printed circuit 106 (which extend through opening 136 in mid-chassis 138 via tail 108), signal pin(s) on connector 116, signal pin(s) on connector 154, and corresponding signal traces (not shown) that extend from connector 154 to UWB components 150 on logic board 148. Similarly, the signal conductor 52 of the radio-frequency transmission line path(s) 50 (FIG. 3) for the millimeter/centimeter wave antenna(s) 40ML and/or 40MH on array module 92 may be formed from signal traces 112 on flexible printed circuit 106 (which extend through opening 136 in mid-chassis 138 via tail 108), signal pin(s) on connector 116, signal pin(s) on connector 154, and corresponding signal traces (not shown) that extend from connector 154 to millimeter/centimeter wave components 152 on logic board 148.

By layering modules 94 and 92 onto lateral surface 151 of mid-chassis 138 and layering logic board 148 onto lateral surface 149 of mid-chassis 138 in this way (e.g., onto opposing sides of mid-chassis 138) and folding tail 108 of flexible printed circuit from interior cavity 140 to interior cavity 142 through opening 136, the radio-frequency routing distance between UWB components 150 and UWB module 94 and between millimeter/centimeter wave components 152 and array module 92 may be minimized. This may serve to minimize radio-frequency signal loss (e.g., path loss) in conveying radio-frequency signals between logic board 148 and modules 94 and 92, while still allowing modules 92 and 94 to convey radio-frequency signals through the rear face of device 10, and while allowing rear housing wall 12R to be easily removed from device 10.

Figure 11:
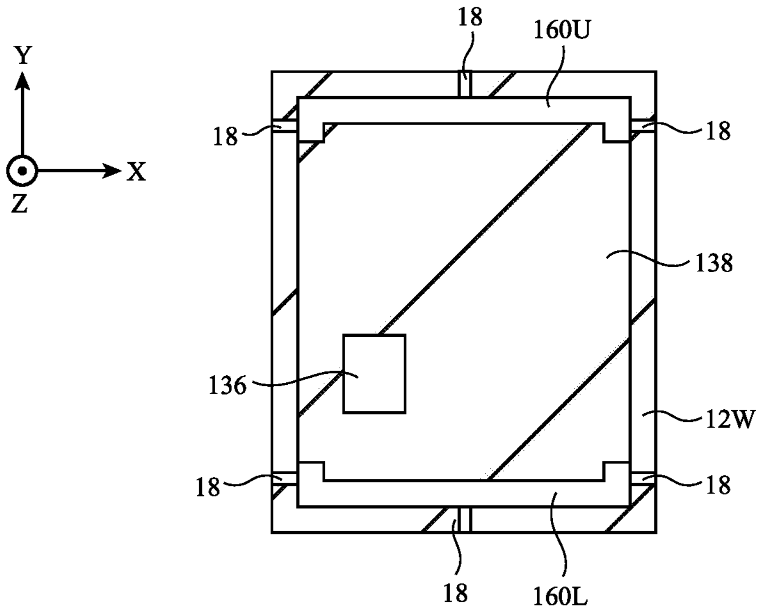
FIG. 11 is an interior top view showing how an illustrative mid-chassis may completely surround an opening for accommodating a folded flexible printed circuit in an antenna system in accordance with some embodiments.
Figure 12:
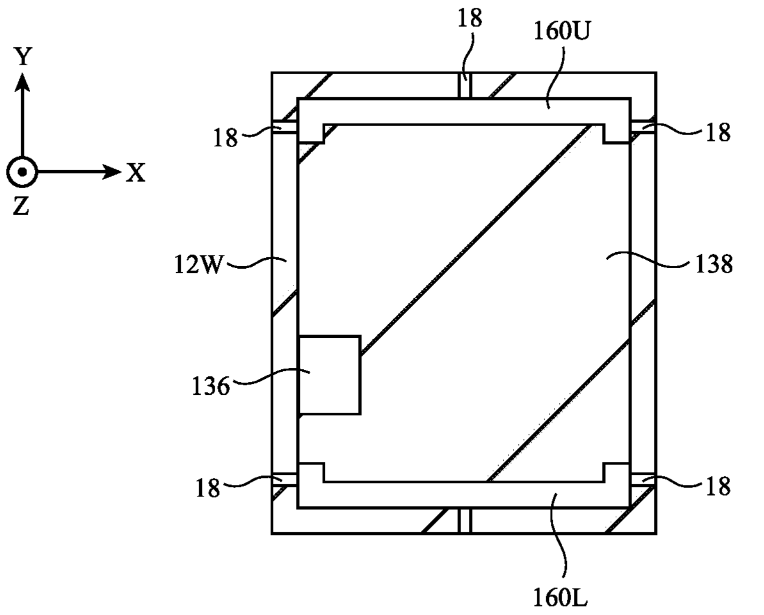
FIG. 12 is an interior top view showing how an opening for accommodating a folded flexible printed circuit in an antenna system may be defined between a mid-chassis and peripheral conductive housing structures in accordance with some embodiments.

FIGS. 11 and 12 are interior top views showing two examples of how opening 136 may be formed in mid-chassis 136. In the examples of FIGS. 11 and 12, the interior components of device 10 (e.g., display 14, logic board 148, antenna system 90, etc.) have been omitted for the sake of clarity.

As shown in FIGS. 11 and 12, mid-chassis 138 may extend across the entire width of device 10 between opposing sidewalls of peripheral conductive housing structures 12W (e.g., left and right sidewalls of device 10). Mid-chassis 138 and the left and right sidewalls may, for example, be formed from integral portions of a single piece of machined metal. Mid-chassis 138 may be separated from a first portion of peripheral conductive housing structures 12W (e.g., at the top of device 10) by a first slot 160U (e.g., extending between first and second gaps 18 on the left and right sides of device 10). Mid-chassis 138 may also be separated from a second portion of peripheral conductive housing structures 12W (e.g., at the top of device 10) by a second slot 160L (e.g., extending between third and fourth gaps 18 on the left and right sides of device 10). Slots 160U and 160L may, for example, be used to separate antenna resonating elements formed from peripheral conductive housing structures 12W at the top and bottom ends of device 10, respectively, from the corresponding antenna ground (e.g., mid-chassis 138).

Opening 136 may be relatively small so as to maximize the mechanical strength that mid-chassis 138 provides to device 10 (e.g., to prevent external twisting or bending forces from damaging device 10). On the other hand, opening 136 may be sufficiently large so as to allow tail 108 of flexible printed circuit 106 (FIG. 9) to extend through opening 136. Opening 136 may, for example, have a width, diameter, or largest lateral dimension of 2-30 mm. Opening 136 in FIGS. 11 and 12 has a rectangular shape. This is merely illustrative. In general, opening 136 may have any desired shape (e.g., having any desired number of straight and/or curved sides).

In the example of FIG. 11, opening 136 is completely surrounded by mid-chassis 138. In other words, mid-chassis 138 defines all sides of opening 136. When completely surrounded by mid-chassis 138, opening 136 may be disposed at or near the center of device 10 or at any other desired location between peripheral conducive housing structures 12W and slots 160U/160L.

In the example of FIG. 12, some of the sides of opening 136 are defined by mid-chassis 138 whereas at least one side of opening 136 is defined by peripheral conductive housing structures 12W. In this example, opening 136 is disposed along one of the lateral edges of device 10 (e.g., along a sidewall formed by peripheral conductive housing structures 12W. In general, opening 136 may be at any desired location in mid-chassis 138.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is illustrative and various modifications can be made by those skilled in the art without departing from the scope and spirit of the described embodiments. The foregoing embodiments may be implemented individually or in any combination.

What is claimed is:

1. An electronic device comprising:

a housing having peripheral conductive housing structures, a dielectric cover layer mounted to the peripheral conductive housing structures, and a conductive plate extending between opposing walls of the peripheral conductive housing structures;

a display mounted to the peripheral conductive housing structures opposite the dielectric cover layer;

a logic board interposed between the display and conductive plate;

a flexible printed circuit having a body and a tail extending away from the body, wherein the body is interposed between the conductive plate and the dielectric cover layer, the tail is coupled to the logic board, and the tail is folded through a hole in the conductive plate;

an antenna mounted to the body of the flexible printed circuit and configured to convey first radio-frequency signals through the dielectric cover layer; and a phased antenna array mounted to the body of the flexible printed circuit and configured to convey second radio-frequency signals through the dielectric cover layer.

2. The electronic device of claim 1, further comprising:

a first radio-frequency transmission line path coupled to the antenna; and a second radio-frequency transmission line path coupled to the phased antenna array, wherein the first and second radio-frequency transmission line paths comprise signal traces on the flexible printed circuit that extend from the body and through the tail of the flexible printed circuit.

3. The electronic device of claim 2, further comprising:

a first radio-frequency connector on the tail of the flexible printed circuit and coupled to the signal traces; and a second radio-frequency connector on the logic board and coupled to the first radio-frequency connector.

4. The electronic device of claim 3, further comprising:

radio-frequency circuitry on the logic board and coupled to the second radio-frequency connector, the radio-frequency circuitry being configured to adjust a beam pointing direction of the phased antenna array.

5. The electronic device of claim 3, wherein the signal traces comprise an impedance matching stub.

6. The electronic device of claim 1, wherein the logic board is layered onto the conductive plate and the body of the flexible printed circuit is layered onto the conductive plate.

7. The electronic device of claim 1, wherein the hole is completely surrounded by the conductive plate.

8. The electronic device of claim 1, wherein the hole has at least one edge defined by the conductive plate and at least one edge defined by the peripheral conductive housing structures.

9. The electronic device of claim 1, further comprising:

a first dielectric substrate mounted to the body of the flexible printed circuit, the antenna being disposed on the first dielectric substrate; and a second dielectric substrate different from the first dielectric substrate and mounted to the body of the flexible printed circuit, the phased antenna array being disposed on the second dielectric substrate.

10. The electronic device of claim 9, wherein the first dielectric substrate and the second dielectric substrate are surface-mounted to the body of the flexible printed circuit.

11. The electronic device of claim 9, wherein the first dielectric substrate and the second dielectric substrate are separated from the dielectric cover layer by a non-zero distance.

12. The electronic device of claim 1, wherein the tail is folded by at least 90 degrees around at least one axis.

13. An electronic device comprising:

a housing having peripheral conductive housing structures;

a display mounted to the peripheral conductive housing structures;

a housing wall mounted to the peripheral conductive housing structures opposite the display;

a conductive mid-chassis extending between opposing walls of the peripheral conductive housing structures, wherein a first cavity is defined between the conductive mid-chassis and the display and a second cavity is defined between the conductive mid-chassis and the housing wall;

a flexible printed circuit disposed in the second cavity and having a tail that extends into the first cavity through an opening in the conductive mid-chassis;

a first dielectric substrate mounted to the flexible printed circuit within the second cavity;

a first antenna on the first dielectric substrate and configured to convey, through the housing wall, first radio-frequency signals in a first frequency band;

a second dielectric substrate separate from the first dielectric substrate and mounted to the flexible printed circuit within the second cavity; and a second antenna on the second dielectric substrate and configured to convey, through the housing wall, second radio-frequency signals in a second frequency band different from the first frequency band.

14. The electronic device of claim 13, wherein the flexible printed circuit is layered onto the conductive mid-chassis within the second cavity.

15. The electronic device of claim 14, further comprising:

a logic board layered onto the conductive mid-chassis within the first cavity.

16. The electronic device of claim 15, further comprising:

a first radio-frequency connector on the logic board; and a second radio-frequency connector on the tail of the flexible printed circuit and coupled to the first radio-frequency connector.

17. The electronic device of claim 16, wherein the first dielectric substrate and the second dielectric substrate are separated from the housing wall by a non-zero distance.

18. An electronic device comprising:

a housing having peripheral conductive housing structures, a conductive plate extending between opposing walls of the peripheral conductive housing structures, and a dielectric cover layer mounted to the peripheral conductive housing structures;

a display mounted to the peripheral conductive housing structures opposite the dielectric cover layer, wherein a first cavity is defined between the display and the conductive plate and a second cavity is defined between the conductive plate and the dielectric cover layer;

a flexible printed circuit having a first portion disposed within the second cavity and having a second portion that extends, from the first portion, into the second cavity through a slot in the conductive plate;

a first antenna module mounted to the first portion of the flexible printed circuit and configured to convey first radio-frequency signals through the dielectric cover layer; and a second antenna module mounted to the first portion of the flexible printed circuit and configured to convey second radio-frequency signals through the dielectric cover layer.

19. The electronic device of claim 18, further comprising:

a first radio-frequency transmission line path coupled to the first antenna module and extending through the second portion of the flexible printed circuit;

a second radio-frequency transmission line path coupled to the second antenna module and extending through the second portion of the flexible printed circuit; and a logic board disposed in the first cavity and comprising radio-frequency circuitry coupled to the first radio-frequency transmission line path and the second radio-frequency transmission line path.

20. The electronic device of claim 19, wherein the logic board is layered onto a first lateral surface of the conductive plate and the first portion of the flexible printed circuit is layered onto a second lateral surface of the conductive plate opposite the first lateral surface.

* * * * *